May 23, 1950  C. F. WORTHINGTON  2,508,559
LIVE BAIT HARNESS
Filed April 19, 1948
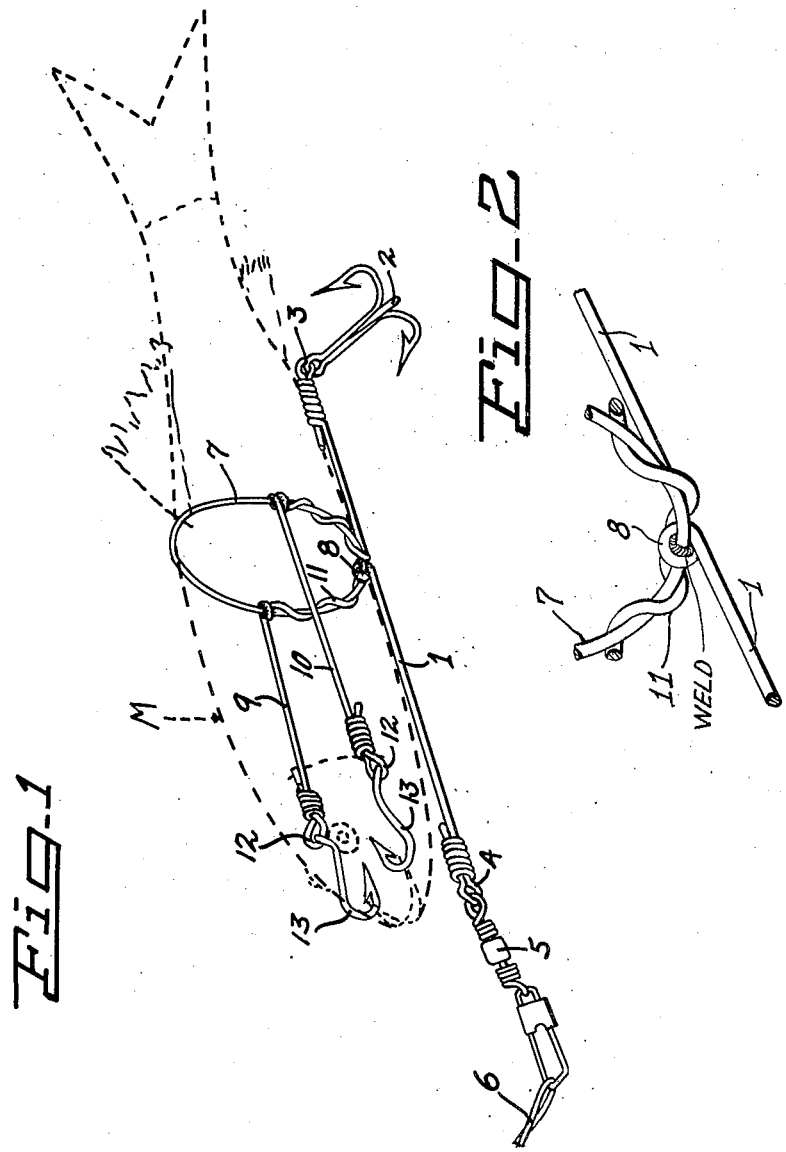
INVENTOR.
Charles F. Worthington
BY
*Glenn L. Fish*
ATTORNEY Patented May 23, 1950

2,508,559

UNITED STATES PATENT OFFICE 2,508,559

LIVE BAIT HARNESS

Charles F. Worthington, Spokane, Wash.

Application April 19, 1948, Serial No. 21,819

2 Claims. (Cl. 43—44.4)

The present invention relates to the general class of fish lures and fishing appliances, and more specifically to an improved live bait harness which while well adapted for various purposes, is especially designed for confining a minnow, water dog, or other live-bait for salmon fishing, to lure the fish to the hook or hooks of the harness.

The primary object of the invention is the provision of a harness that is simple in construction, into which the live bait may be inserted with facility, and confined without material injury in such manner as to prevent its escape, and to permit swimming movements of the live bait for effective luring of the fish. The harness is equipped with rear hooks properly arranged for catching the fish.

The harness includes a minimum number of parts that may with facility be manufactured at low cost of production and the parts may be assembled with convenience, to insure a durable and effective means for the performance of its required functions.

In the accompanying drawings I have illustrated a complete example of a physical embodiment of my invention in which the parts are combined and arranged in accord with one mode I have devised for the practical application of the principles of my invention. It will however be understood that various changes and alterations are contemplated and may be made in these exemplifying drawings, within the scope of my appended claims without departing from the principles of the invention.

Figure 1 is a perspective view showing a live bait in dotted lines and confined within a harness in which my invention is physically embodied; and Figure 2 is an enlarged fragmentary perspective detail view of the confining loop and the base bar.

In the form of the invention shown in Figure 1 where a minnow M, or other live bait is confined in the harness which is constructed of resilient wire, I employ a longitudinally extending base wire 1 having at its rear end a three-prong fish hook 2 that is flexibly connected to the base wire by an eye at 3. The front or forward end of the base wire terminates in an eye 4 to which a swivel coupling 5 is attached, and a usual leader 6 is provided for attachment to a customary line.

At a suitable location intermediate the ends of the base wire a spring hoop, band, or holder 7 is transversely arranged and mounted on the base wire, as by means of an eye 8, and a rigid and secure connection is made between the hoop and base wire as by welding.

In Fig. 1 the confining hoop or holder 7 is utilized to support a pair of laterally spaced and forwardly projecting longitudinal arms 9 and 10, preferably fashioned of a single wire with its middle portion entwined, twisted, or spirally wrapped around the lower portion of the hoop as at 11, to insure a firm support for the arms and also to reinforce the rigid joint between the hoop and the base wire.

The front or forward ends of the respective arms terminate in eyes 12, 12, and a pair of fish hooks 13, 13, of suitable type are coupled to the ends of the arms.

In Fig. 1 the live bait is fitted into the harness by inserting it from the front, tail-first, into the hoop or holder 7 until the larger size of the forward portion of the bait prevents further insertion, and in such position the live bait cannot back out of the hoop. The fish hooks 13, 13 are then caught in the opposite sides of the bait's mouth or gills, to prevent forward escape from the harness. The bait is thus confined, without material injury in its harness against escape, with its tail free to move for normal action in the water, as a live-bait lure for catching fish.

Having thus fully described my invention, what I claim as new and desire to secure by Letters Patent is:

1. In a live bait harness of resilient wire, the combination with a base wire having a fish hook coupled at its rear end, a leader flexibly coupled at its front end, and an intermediate integral eye, of a transversely arranged hoop made rigid with and passing through the eye, a pair of laterally spaced and forwardly projecting arms rigidly mounted on the hoop, and a fish hook coupled at the front end of each arm.

2. In a live bait harness of resilient wire, the combination with a base wire having a fish hook coupled at its rear end, a leader flexibly connected at its front end, and an integral intermediate eye, of a hoop passing through and welded in the eye and arranged transversely of the base wire, a single wire entwined about the lower portion of the hoop and terminating in a pair of laterally spaced and forwardly projecting arms, and a fish hook coupled at the front end of each arm.

CHAS. F. WORTHINGTON.

REFERENCES CITED

The following references are of record in the file of this patent:

UNITED STATES PATENTS

| Number | Name | Date |
|---|---|---|
| 940,465 | Koch | Nov. 16, 1909 |
| 2,093,954 | Chilcott | Sept. 21, 1937 |
| 2,407,759 | McDougal | Sept. 17, 1946 |